Aug. 30, 1966 W. R. AZIM 3,269,681
ADJUSTABLE SUPPORT APPARATUS
Filed Jan. 27, 1965
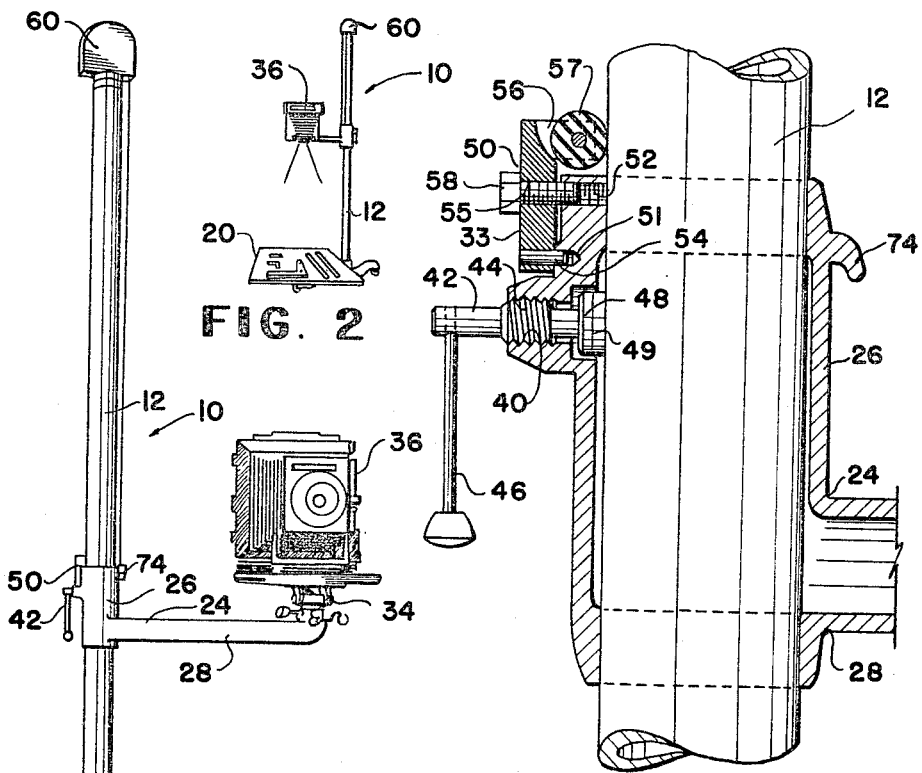
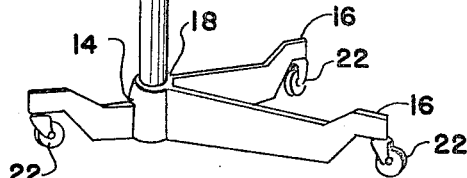
FIG. 1
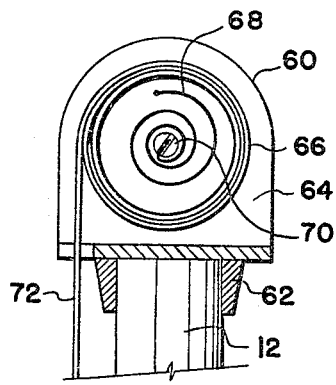
FIG. 5
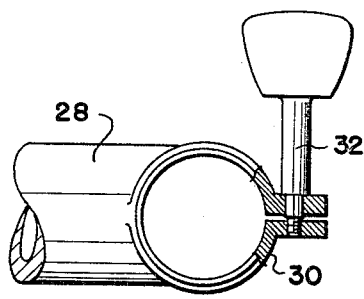
FIG. 4
INVENTOR.
WAKEEM R. AZIM
BY
Wilkinson and Steffel
ATTORNEYS

United States Patent Office 3,269,681
Patented August 30, 1966

3,269,681
ADJUSTABLE SUPPORT APPARATUS
Wakeem R. Azim, 422 S. Oliver, Wichita, Kans.
Filed Jan. 27, 1965, Ser. No. 428,302
5 Claims. (Cl. 248—123)

This invention relates to support apparatus, more particularly to adjustable upright support apparatus, more particularly to an adjustable upright support apparatus particularly adapted to support a camera or the like. Still more particularly the invention relates to a camera stand provided with novel adjustable roller means to provide ease of sliding movement of a support for a camera.

Upright support apparatus, more particularly camera stands, are in general old in the art. Numerous different types of such support apparatus are known to the prior art, including stands adapted to support cameras. Camera stands used by professional photographers must of necessity be relatively heavy and sturdy in order to provide the necessary stability. Further, such stands must be made to close tolerances in order to provide a firm steady support for the camera. This type of camera stand normally embodies an upright column with a sleeve element slidably disposed on the coluumn having a projecting arm on which the camera can be mounted. Frequent difficulty is experienced when moving the sleeve on the column, particularly if the camera, the sleeve, and the supporting arm are relatively heavy. When the sleeve of a conventional stand is moved along the column it is very common for "chattering" to occur. "Chattering" is a rapid alternate sticking and sliding of an element. This is very troublesome making movement of the camera support relative to the column quite difficult, and in certain instances it can be harmful to delicate camera mechanisms, and the like.

I have invented a new support stand. The support stand of my invention has an upright column, a base on the column, and a support means slidably mounted on the column. The support means has a sleeve disposed on the column and is provided with a projecting arm and an adjustable roller means. The adjustable roller means is mounted on the sleeve, preferably opposite the projecting arm, and has a roller, a roller arm with the roller mounted thereon, and a means for pivotally supporting the roller arm on the sleeve. A means, preferably a bolt, is used to adjustably secure the roller arm relative to the sleeve. The adjustable roller means when properly adjusted will provide ease of movement of the support means relative to the column.

The adjustable support stand of my invention solves many problems associated with support stands known to the prior art, particularly relatively heavy camera stands normally used by professional photographers. The support stand of my invention is provided with a small adjustable roller which is normally positioned opposite the projecting arm supporting the camera or other apparatus. This roller arm can be very simply and quickly adjusted to eliminate "chattering" or vibration when the support arm is moved relative to the column. The roller will also greatly reduce the sliding friction. Elimination of "chattering" safeguards the camera mounted on the end of the arm, and also prevents the surface of the column and the sleeve from becoming roughened. If the surface of the column should become roughened movement of the sleeve on the column would be very seriously hampered.

An object of this invention is to provide a new adjustable support apparatus.

Another object of this invention is to provide a support apparatus having a roller adjustment means which provides ease of movement of the parts thereof.

Still another object of this invention is to provide a camera support having an upright column, and a sleeve slidable thereon which is provided with a simple but very effective adjustable roller means which insures ease of movement of the sleeve relative to the column.

Still another object of this invention is to provide an adjustable support apparatus that is inexpensive to produce and simple to use and adjust.

Yet another object of this invention is to provide a camera support stand having an upright column and a sleeve with a projecting arm mounted thereon which sleeve is provided with an adjustable roller means and a locking means, which respective functions of the locking means and roller means do not interfere with each other.

Other objects and advantages of the new support apparatus will become obvious to those skilled in the art upon reading the disclosure. Drawings accompany and are a part of this disclosure. These drawings depict preferred specific embodiments of the new adjustable support apparatus of my invention, and it is to be understood that such drawings are not to unduly limit the scope of my invention.

In the drawings:

FIG. 1 is a perspective view of a preferred specific embodiment of the support stand of my invention shown with a camera mounted thereon.

FIG. 2 is a perspective view, in reduced scale, of a preferred specific embodiment of my support stand having a camera and a layout board mounted thereon.

FIG. 3 is a fragmentary view in cross section in enlarged scale showing the structural details of the slidable sleeve, locking means, and adjustable roller means.

FIG. 4 is a fragmentary view in partial cross section showing the annular clamp means on the extending end of the support arm of my invention.

FIG. 5 is a fragmentary view in cross section illustrating a preferred specific embodiment of the balance means of my invention.

The following is a discussion and description of the new adjustable support apparatus of my invention made with reference to the drawings, wherein the same reference numerals are used to indicate the same or similar parts and/or structure. The discussion and description is of preferred specific embodiments of the new support apparatus of my invention, and it is to be understood that such is not to unduly limit the scope of my invention.

Referring now to the drawings, FIGS. 1 through 5, there is depicted a preferred camera stand embodiment 10 of the support apparatus of my invention. The camera stand 10 of my invention has an elongated upright tubular column 12 with a base 14 connected to the lower end thereof. The base 14 has a plurality of generally horizontal, radiating legs with upwardly projecting end portions. At least two of the legs are preferably provided with top flat support surfaces 16 on the projecting ends. A support suface 18 is provided on the base 14 adjacent the column. The support surface 18 is positioned at approximately the same vertical height as the flat support surfaces 16. The support surfaces 16 and 18 are adapted to firmly support a layout board 20 below a camera 36, as shown in FIG. 2. The board 20 is supported at three spaced points and will therefore not rock. Casters 22 are mounted on the projecting end portions of the legs of base 14.

A camera support 24 is slidably and rotatably mounted on column 12 of stand 10. The camera support 24 has a sleeve 26 which is slidably disposed about column 12. A projecting arm 28 is mounted on sleeve 26, which arm is provided with an annular clamp means 30 on the end thereof, shown in detail in FIG. 4. The clamp means 30 has a split annular portion with a threaded means 32 connected to a knob mounted to force the ends of clamp 30 in close relation. Clamp 30 is adapted to mount a conventional camera adjustment head 34 thereon, which in turn supports a camera 36. With this arrangement the camera can be adjusted in any suitable or desired position.

A mechanism is provided to lock the camera support 24 relative to column 12. This lock consists of a threaded aperture 40 positioned in sleeve 26, preferably opposite support arm 28, a plunger 42 having a threaded portion 44 in threaded engagement with threaded aperture 40, a handle 46 on the extending end of plunger 42, a follower block 48 on the inwardly extending end of plunger 44, and a shoe 49 secured to the follower block and adapted to selectively engage the column 12.

An adjustable roller means 50 is also mounted on sleeve 26, preferably opposite the projecting arm 28. The adjustable roller means has a recess 51, and a threaded aperture 52 in the sleeve opposite the extending arm 28. A roller arm 33 is pivotally mounted on sleeve 26. The roller arm 33 has a detent 54 which is positioned in recess 51 to thereby pivotally secure one end of the arm 33 to the sleeve. An aperture 55 is positioned in generally the central portion of arm 33. A bifurcated portion 56 is provided on arm 33 opposite detent 54, with a roller 57 mounted thereon. The bolt 58 is disposed in the central aperture 55 in arm 33, and threadedly engaged in threaded aperture 52 is sleeve 26. By adjusting bolt 58 it can be seen that the position of the roller 57 can be varied relative to the sleeve 26. The roller 57 provides a rolling support for the upper edge of the sleeve 26, which is opposed from the extending arm 28. Arm 28 is preferably positioned on the lower portion of sleeve 26. The roller 57, in use, prevents "chattering" and also binding of the sleeve on the column 12 when the support arm is moved along the upright column 12. A very significant feature of applicant's applicable support apparatus is that the locking mechanism 42 is provided adjacent the adjustable roller support 50. When the locking mechanism 42 is moved into engagement it exerts a relatively large force which tends to move the sleeve away from the column at the point of engagement. When the adjustable roller support 50 is positioned adjacent the locking mechanism no strain is imposed on it during the locking operation.

Additional roller means 50 can be mounted on sleeve 26 to further insure ease of movement. For example, it has been found that one or more roller means positioned on the lower end of sleeve 26, preferably adjacent arm 28, is very advantageous. More preferably, two roller means are provided which are circumferentially spaced approximately 90 degrees and positioned beneath arm 28.

A spring balance 60 is rotatably mounted on the top of column 12. The structure of spring balance is shown in detail in FIG. 5. The spring balance 60 has a collar 62 disposed on the top of column 12, two flat and spaced upright elements 64 secured to collar 62, and a pulley 66 rotatably mounted between and on upright elements 64. A coil spring 68 is mounted within pulley 66 and has one end 70 anchored relative to elements 64, preferably in the bolt means supporting the pulley, and the other end secured to the pulley 66. It can be seen that movement of the pulley will wind or unwind the coil spring 68. The position of the coil spring 68 will determine the amount of torque applied to the pulley. A cable 72 is provided having a portion mounted on pulley 66 and an end secured to camera support 24. The end of the cable can be secured to a projection 74 on sleeve 26.

Various other arrangements can be substituted for the spring balance 60. As for example, a cable can be entrained over a pulley mounted on the top of upright column 12 and a counterweight attached to the end and slidably positioned within the upright column 12. Another suitable arrangement can be provided wherein the cable is wound around a pulley which in turn is connected to a two-way electric motor. Activation of the motor then raises and lowers the camera support 24.

As will be obvious to those skilled in the art, various changes and modifications of the preferred camera stand of my invention as described herein can be made or followed without departing from the spirit of the disclosure or the scope of the claims.

I claim:

1. A camera support stand comprising, an upright elongated tubular column, a base connected to the lower end of said column having a plurality of generally horizontal radiating legs, upwardly projecting end portions having top flat support surfaces on the projecting ends of at least two of said legs, a support surface on said base adjacent said column positioned at the same vertical height as said support surfaces on said legs, casters mounted on the projecting end portions of said legs, a camera support slidably and rotatably mounted on said column having a sleeve slidably disposed on said column, a projecting arm, an annular clamp means on the projecting end of said arm, a means mounted on said sleeve to lock said camera support relative to said column positioned opposite said projecting arm, and an adjustable roller means on the top portion of said sleeve mounted opposite said projecting arm, said means to lock comprising, a first threaded aperture in said sleeve opposite said projecting arm, a plunger having a threaded portion in threaded engagement with said first threaded aperture, a handle on the extending end of said plunger, a follower block on the inwardly extending end of said plunger, and a shoe on said follower block adapted to selectively engage said column, said adjustable roller means comprising, a recess in said sleeve, a second threaded aperture in said sleeve in vertical spaced relation to said recess, and a roller arm having a centrally disposed aperture, a detent on one end of said roller arm disposed in said recess, a bifurcated portion on the opposite end of said arm, a roller rotatably mounted in said bifurcated portion, and a bolt disposed in said central aperture of said roller arm and threadedly engaged in said second threaded aperture in said sleeve, a spring balance rotatably mounted on the top of said column having a collar disposed on the top of said column, two flat and spaced upright elements, a pulley mounted between said elements and a coil spring having one end anchored relative said elements and the other end secured to said pulley, and a cable having a portion wound in said pulley and having an end secured to said camera support, said camera support stand adapted to support a camera while providing a roller adjustment to provide ease of movement of said sleeve relative to said column.

2. A camera support stand comprising, an upright elongated tubular column, a base on the lower end of said column having a plurality of radiating legs, casters mounted on the projecting end portions of said legs, a camera support slidably mounted on said column having a sleeve slidably disposed on said column, a projecting arm on said sleeve, a clamp means on the projecting end of said arm, a means to lock said camera support relative to said column, and an adjustable roller means on the top portion of said sleeve, said means to lock comprising, a first threaded aperture in said sleeve, a plunger having a threaded portion in threaded engagement with said first threaded aperture, a handle on said plunger, and a surface on the inwardly extending end of said plunger adapted to selectively engage said column, said adjustable roller means comprising, a recess in said sleeve, a second threaded aperture in said sleeve in spaced relation to said recess, and a roller arm having an aperture, a detent in one end of said roller arm disposed in said recess, a roller rotatably mounted on the opposite end of said roller arm, and a bolt disposed in said aperture in said roller arm and in threaded engagement with said second threaded aperture in said sleeve, a spring balance mounted on the top of said column having a pulley therein, a cable wound on said pulley of said spring balance with an end thereof secured to said camera support, said camera support stand adapted to support a camera or the like while providing a roller adjustment to provide ease of movement of said sleeve relative to said column.

3. A support stand comprising, an upright elongated tubular column, a base on the lower end of said column, a support means slidably mounted on said column having a sleeve slidably disposed on said column, a projecting arm mounted on said sleeve, a means to lock said camera support relative to said column, and an adjustable roller means on the top portion of said sleeve opposite said projecting arm, said adjustable roller means comprising, a recess in said sleeve, a threaded aperture in said sleeve in spaced relation to said recess, and a roller arm having an aperture, a detent in one end of said roller arm disposed in said recess, a bifurcated portion in the opposite end of said arm, a roller mounted in said bifurcated portion, and a threaded means disposed in said aperture in said roller arm and threadedly engaged in said threaded aperture in said sleeve, a balance means mounted on the top of said column, a cable connected at one end to said support means and operatively connected to said balance means, said adjustable roller means on said support means adapted to provide ease of movement of said sleeve relative to said column.

4. A support stand comprising, an upright column, a base on said column, a support means slidably mounted on said column having a sleeve disposed on said column, a projecting arm on said sleeve, a means to lock said support means relative to said column, and adjustable roller means on said sleeve opposite said projecting arm, said adjustable roller means comprising, a roller arm, means to pivotally secure one end of said roller arm to said sleeve, a roller mounted on the opposite end of said roller arm, and a threaded means to position said roller arm relative to said sleeve, said roller means adapted to provide ease of movement of said sleeve relative to said column.

5. A support stand comprising, an upright column, a base on said column, a support means slidably mounted on said column having a sleeve disposed on said column, a projecting arm, an adjustable roller means on said sleeve having a roller, a roller arm supporting said roller on one end, means pivotally supporting said roller arm on said sleeve, a means to adjustably secure said roller arm relative said sleeve, said adjustable roller means adapted to provide ease of movement of said support means relative to said column.

References Cited by the Examiner
UNITED STATES PATENTS

| | | | |
|---|---|---|---|
| 1,174,858 | 3/1916 | Hamilton | 287—58 X |
| 1,414,658 | 5/1922 | Meyer | 248—124 X |
| 1,611,903 | 12/1926 | Gelb | 248—123 |
| 1,754,006 | 4/1930 | Anderson | 248—123 |

CLAUDE A. LE ROY, *Primary Examiner.*

R. P. SEITTER, *Assistant Examiner.*